(12) United States Patent
Bohlender (10) Patent No.: US 7,026,584 B2
(45) Date of Patent: Apr. 11, 2006

(54) ELECTRIC HEATER WITH HOUSING

(75) Inventor: Franz Bohlender, Kandel (DE)

(73) Assignee: Catem GmbH & Co. KG, Herxheim bei Landau (DE)

( * ) Notice: Subject to any disclaimer, the term of this patent is extended or adjusted under 35 U.S.C. 154(b) by 0 days.

(21) Appl. No.: 10/743,340

(22) Filed: Dec. 19, 2003

(65) Prior Publication Data

US 2005/0072774 A1 Apr. 7, 2005

(30) Foreign Application Priority Data

Dec. 19, 2002 (EP) .................................. 02028198

(51) Int. Cl.
*H05B 3/10* (2006.01)
(52) U.S. Cl. ........................ 219/548; 392/347
(58) Field of Classification Search ............... 392/347, 392/355, 365; 219/202, 540, 504
See application file for complete search history.

(56) References Cited

U.S. PATENT DOCUMENTS 5,057,672 A 10/1991 Bohlender et al.
5,377,298 A * 12/1994 Yang ........................... 392/360

FOREIGN PATENT DOCUMENTS

| DE | 197 06 199 A | 8/1998 |
| EP | 0 307 217 A1 | 3/1989 |
| EP | 0 333 906 A | 9/1989 |
| EP | 1 1130 337 A2 | 9/2001 |

* cited by examiner

*Primary Examiner*—Thor S. Campbell
(74) *Attorney, Agent, or Firm*—Boyle Fredrickson Newholm Stein & Gratz S.C.

(57) ABSTRACT

The present invention relates to a novel constructional principle for electric heaters, wherein the functions of frame and resilient means are separated from one another. As a frame for an electric heater, a housing is used that consists of two half-shells. Positioning aids for the PTC heating elements are arranged in the housing. The longitudinal sides of the housing are essentially made open to allow for air throughput through the heating register. A resilient device is additionally inserted into the housing, the resilient device compressing the layered structure of radiator elements, PTC heating elements and contact sheets. After the heater has been assembled, the resilient device can be inserted through a lateral opening into the heater.

42 Claims, 12 Drawing Sheets

ELECTRIC HEATER WITH HOUSING

BACKGROUND OF THE INVENTION

1. Field of the Invention

The present invention relates to an electric heater, particularly as an auxiliary heating means for an automotive vehicle.

2. Description of the Related Art

For use in automotive vehicles, particularly automotive vehicles with new, consumption-optimized engines, in which a reduced amount of heat energy is observed, electric auxiliary heaters are used for heating passenger compartment and engine. Such electric heaters are however also suited for other purposes, e.g. in the field of building installations, particularly air conditioning, in industrial plants, or the like.

Preferably, PTC heating elements with radiator elements in heat-conducting communication are used for such an electric auxiliary heater for an automotive vehicle. The heat generated by the PTC heating elements is discharged via the radiator elements to the air flowing therethrough. The total assembly consisting of a layered structure of PTC heating elements, radiator elements and contact sheets, which serve the supply of power, is kept in a clamp fit within a frame for increasing the efficiency of the heater. Due to clamping action a high electrical and thermal contacting of the PTC heating elements is achieved.

The layered structure is held within a stable frame having a preferably U-shaped cross-section. The frame is configured such that it compresses the layered structure. The clamping action can alternatively be effected by resilient elements arranged within the layered structure. To enable the frame to absorb the resilient forces, it is made particularly stable from a mechanical point of view. Preferably, it is configured with a U-shaped cross-section. Such a conventional heater is e.g. known from DE-A-101 21 568.

The minimum height of the longitudinal bars of such a frame with U-shaped cross-section (or C-shaped cross-section according to DE-A-101 21 568) is about 11 mm with respect to the necessary clamping forces. This gives the whole heater a height of at least 22 mm that cannot be used for the passage of air. Such a constructional shape with exterior clamping action or exterior holding frame has therefore a large area that cannot be used for air throughput. That is why such electric heaters are not suited for use in the case of very small installation heights.

When electric heaters with an exterior holding frame or exterior clamping action are assembled, troublesome measures are needed for counteracting the contact pressure forces of the resilient means/frame that are objectionable during assembly.

Due to these drawbacks heaters with a conventional holding frame for modern air conditioners, especially for installation in automotive vehicles, are less and less suited. Air conditioners for multi-zone air conditioning in a comfort-based automotive vehicle require more and more heaters of a large length, but small constructional height.

Furthermore, conventional constructions with a holding frame, particularly of metal, have a considerable weight. However, it is desired for installation into automotive vehicles with respect to the total weight of the vehicle that electric auxiliary heaters should be used with a particularly low weight.

A further drawback of metal holder frames is their conductive surface. To enhance the safety in automotive vehicles, metal surfaces are more and more avoided so that their contact is possible without any risk, i.e. without electrical or thermal conduction. To this end the above-described heaters are preferably provided with a coating of plastics, as is e.g. the case with the heater shown in DE-A-101 21 568.

OBJECTS AND SUMMARY OF THE INVENTION

It is an object of the present invention to provide an electric heater with an improved design that does not have the above-mentioned drawbacks.

This object is achieved with the features of the independent claims.

The electric heater of the invention and the housing for an electric heater use a new constructional principle in which the functions of frame and resilient means are separated from one another. The PTC heating elements, the radiator elements and the contact sheets are kept biased by a resilient element in a housing. The housing has opposite openings on the longitudinal faces for allowing air to be heated to flow therethrough. The longitudinal faces are made particularly stable from a mechanical point of view and can therefore absorb particularly high forces. To this end transverse struts which absorb the clamping forces produced by the resilient element are provided in openings of the elongate faces for the air flowing therethrough. With the inventive structure electric heaters can be used in many ways, particularly also in cases where the available constructional height is small.

According to an advantageous development of the invention longitudinal struts are provided in addition to the transverse struts in the openings of the housing sides, so that the struts form a grid structure. As a result, the struts as such can be kept particularly thin, so that they will impede the air throughput only insignificantly and nevertheless prevent deflection or bending of the housing in an efficient way.

To minimize obstruction of the air throughput, the longitudinal struts are particularly arranged such that they are located in the area of the PTC heating elements. Preferably, the housing is made of plastics. An essential advantage of a plastic housing is its small weight, its flexible moldability and its low production costs.

In a further advantageous embodiment of the invention positioning means are provided in the housing for keeping the PTC heating elements mutually spaced apart in a plane perpendicular to the clamping direction. The positioning means are preferably formed as part of the housing. A separate positioning frame is thus no longer needed for fixing the position of the PTC heating elements inside the heater.

According to an advantageous development of the invention the housing has a lateral opening for insertion of the resilient element after assembly of the heater. This makes the manufacture of such a heater much easier because no special devices are needed for overcoming the resilient forces during assembly. The resilient means will only be inserted into the housing when the assembled housing is capable of absorbing the forces produced by the resilient means during compression of the layered structure. The resilient means is preferably guided in a groove.

According to an advantageous embodiment the housing is composed of two half-shells. This permits a particularly simple assembly of the heater. To this end the half-shells are configured such that they can be put together. A particularly fast assembly is possible by using locking pins or locking noses effecting a locking of the two half-shells when the half-shells of the housing are put together.

Both half-shells are preferably designed such that they separate the housing approximately in the middle between the opposite housing sides of an open construction. As a result, the housing is particularly stable at the sides of an open construction, and it is only in the middle, i.e. on the separation line of the two half-shells that the housing can absorb either no or only small clamping forces.

In a particular embodiment the two half-shells are provided on their separation lines with additional projections and recesses that engage one another when put together and interconnect the half-shells. Thus the housing can also absorb higher forces in the central area on the separation lines of the two half-shells.

The resilient element is configured such that it transmits the clamping forces essentially to the reinforced housing sides.

The resilient element consists preferably of a sheet member with obliquely projecting resilient segments. Preferably, the resilient element is made integral with the resilient segment. The resilient means can thus be produced as a continuous member for the first time and supplied by a roll during production. Every resilient means has to be manufactured separately in the prior art and produced individually for different lengths. Since housing and resilient means are separated, the thickness of the resilient means of about 0.8 mm in former times can be reduced to a thickness of about 0.3 mm according to the new constructional principle. As a result, the resilient means can be produced with little effort and without any decrease in the efficiency of the heater.

To achieve a high efficiency of the electric heater, a resilient segment is provided for each position of a PTC heating element, so that the clamping of the PTC heating elements is improved. A particularly high efficiency can be achieved by enhancing the clamping forces, and according to the invention a plurality of resilient segments, preferably two or three, are provided in the area of a PTC heating element.

According to a further preferred embodiment the resilient means consist of a sheet member from which transversely inclined individual resilient segments are projecting, the resilient segments mechanically reinforcing the spring means such that a deflection around the longitudinal axis of the spring means is not possible. To this end the resilient segments extend each into the edge portion of the resilient means so that the resilient means can be supported on the stable outer housing edge. The housing must thus only absorb forces on its edges and can be made less stable in the middle.

According to a particular development of the electric heater a seal is provided between the longitudinal struts and the layered structure.

Such a seal, particularly as a silicone seal, is preferably made as one part and seals the whole grid structure.

Further advantageous embodiments of the invention are the subject of the subclaims.

BRIEF DESCRIPTION OF THE DRAWINGS

The present invention shall now be explained with reference to preferred embodiments taken in conjunction with the attached drawings, which show in detail in.

DETAILED DESCRIPTION OF THE PREFERRED EMBODIMENTS

In contrast to conventional electric heaters for use in automotive vehicles, the heater according to the invention is composed of two half-shells of plastics. During production one housing half can first be equipped in an easy way and the housing is then completed by mounting the second housing half.

Figure 1:
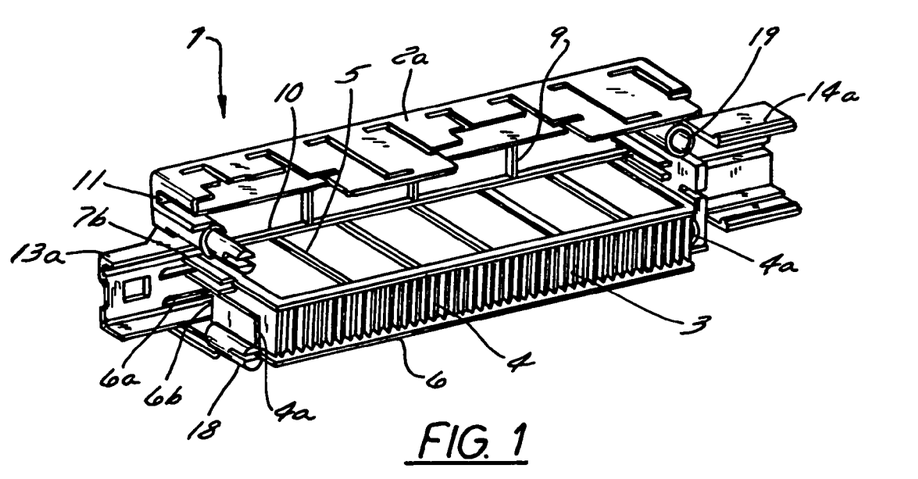
FIG. 1 a perspective view of a half-shell of the housing of the electric heater which is partly equipped.

FIGS. 1 to 4 show successive assembling stages of the heater according to the invention, the stages illustrating the structure of the heater according to the invention. FIG. 1 is a perspective view showing one half-shell 2a of half-shells 2a, 2b of the housing. A contact sheet 6, a radiator element 4 and, next thereto, PTC heating elements 3 are inserted into the half-shell 2a. For an easy assembly guide rails and positioning means, respectively, are provided for all components. Especially the position of the contact plate 6 with the contact pin 6a is defined during insertion via guide 6b (and 7b, respectively, for contact plate 7 in FIG. 2). The radiator elements 4 are preferably designed in the form of corrugated rib elements. At one side the corrugated rib element is provided with a contact plate. Guides 4a are provided laterally in the inside of the housing for the ends of the contact plate of the corrugated rib element 4. Said guides solely serve to facilitate the assembly. In an alternative embodiment, they can thus be omitted as well.

To isolate the PTC heating elements 3 also in the installed state from one another, positioning means 5 are provided in a half-shell of the housing for keeping the PTC heating elements 3 in spaced-apart relationship with one another. Said positioning means 5 are preferably fastened on a longitudinal strut 10 to the lateral housing faces. Said struts will be described in detail in the following.

Figure 2:
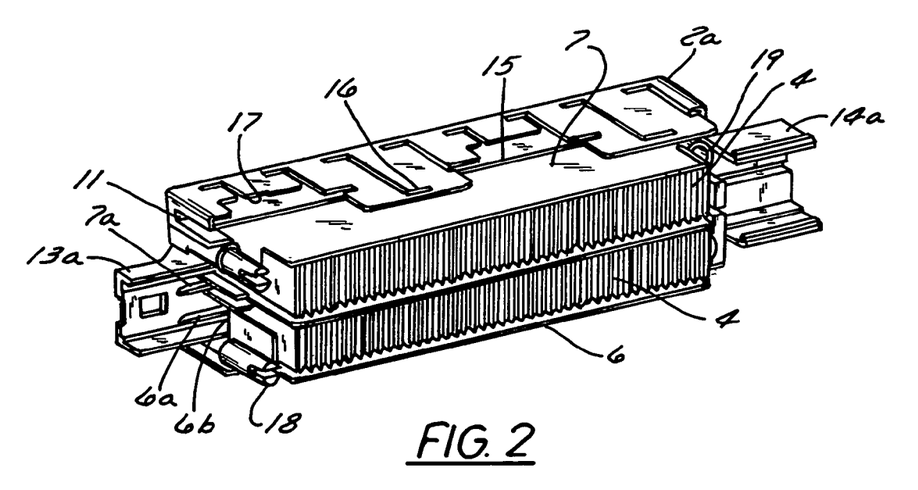
FIG. 2 a perspective view of a half-shell of the housing of the electric heater which is fully equipped.

As shown in FIG. 2, a radiator element 4 and a contact plate 7 with a plug contact 7a are again provided above the PTC heating elements 3, matching the structure shown in FIG. 1. The second half-shell 2b of the housing can be attached to the first half-shell 2a equipped in this way. Both half-shells of the housing are preferably configured such that their separation line extends approximately in the middle between the two elongate housing faces (which comprise the passage openings).

The assembly of the housing can particularly be simplified in that both half-shells 2a, 2b are provided with locking pins 18 and corresponding bores in the respectively opposite half-shell. When the two half-shells are put together, they will lock as soon as the second half-shell 2b has been completely attached to the first half-shell 2a.

Figure 3:
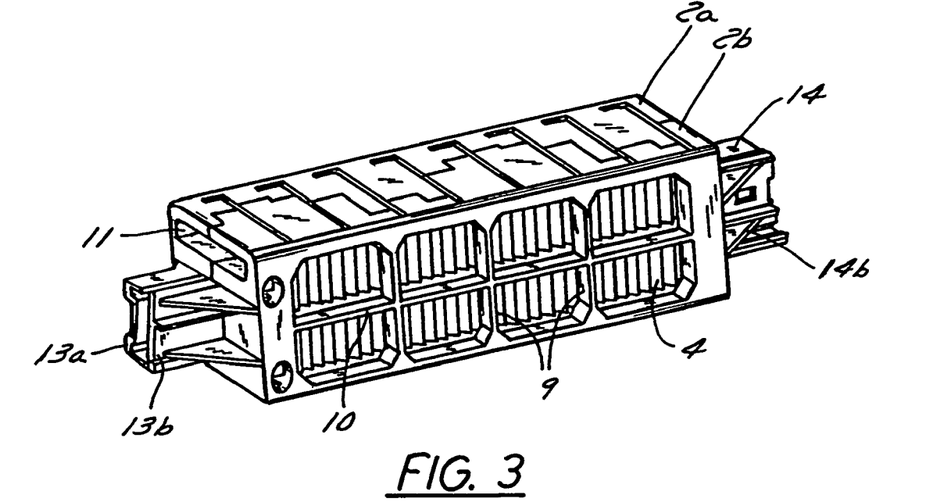
FIG. 3 a perspective view of the electric heater.

The assembled housing of the electric heater is again shown in FIG. 3. As can be seen in FIG. 3, each of the housing halves 2a, 2b is provided on the elongate faces with openings for the air flowing therethrough.

To enhance the efficiency of the heat generation by the PTC heating elements, said elements are kept clamped within the housing in the layered structure described with reference to FIGS. 1 and 2. This clamping action is effected by an additional resilient element 12. Preferably, the resilient element is inserted at least between an inner side of the housing and the layered structure. In addition, such a resilient element may also be inserted between the opposite inner side of the housing and the layered structure or at a place within the layered structure.

To enable the housing to absorb the clamping forces without deformation of the housing, the elongate housing faces are mechanically reinforced. The housing is not capable of absorbing high clamping forces between the mechanically reinforced housing faces, particularly in the area of the separation line.

To be able to absorb particularly high clamping forces, transverse struts 9 are provided inside the lateral opening for the air to be heated. Said transverse struts make it possible for the housing to absorb sufficiently high clamping forces without any deflection or deformation of the housing. The half-shells with the struts are each made integral and are preferably made from plastics.

In a particularly advantageous embodiment, the transverse struts 9 are supplemented by one or more longitudinal struts 10, so that the struts 9 and 10 have the shape of a grid structure. With such a grid structure the transverse struts 9 can be made particularly thin and do not impede the air throughput. A bending up of the housing is efficiently prevented at the same time.

The stability of the housing between the mechanically reinforced faces of the housing is enhanced in an advantageous embodiment by a special design of the upper and lower sides of the half-shells. To this end projections 16 and recesses 17 are respectively provided on the upper and lower housing side of each half-shell 2a, 2b, and are arranged such that they engage into one another when put together. The mechanical stability of the upper and lower sides is thus also enhanced between the mechanically reinforced elongate housing faces.

Since it is only after assembly that the housing is capable of absorbing high clamping forces without any deformation of the housing, the resilient element 12 can only be inserted after assembly of the housing. To this end the housing 2 is provided on a housing side with an opening 11. Such an opening is preferably provided on the narrow sides of the housing 2. Each housing half 2a, 2b has corresponding recesses that in the assembled state of the housing 2 supplement one another to form a slit 11 for insertion of the resilient element 12. A special design of the inner sides of the housing for forming a resilient channel for the insertion of the resilient element 12 will be described in the following with reference to FIGS. 10 to 12.

The positioning means 4a, 5, 6b, 7b, which are provided in the housing, are arranged such that the pre-positioned elements of the heater leave enough space for the resilient element. To be more specific, the pre-positioned elements are fixed with a play in the clamping direction effected by the resilient means to keep them movable and to absorb the clamping pressure generated by the resilient means.

Figure 4:
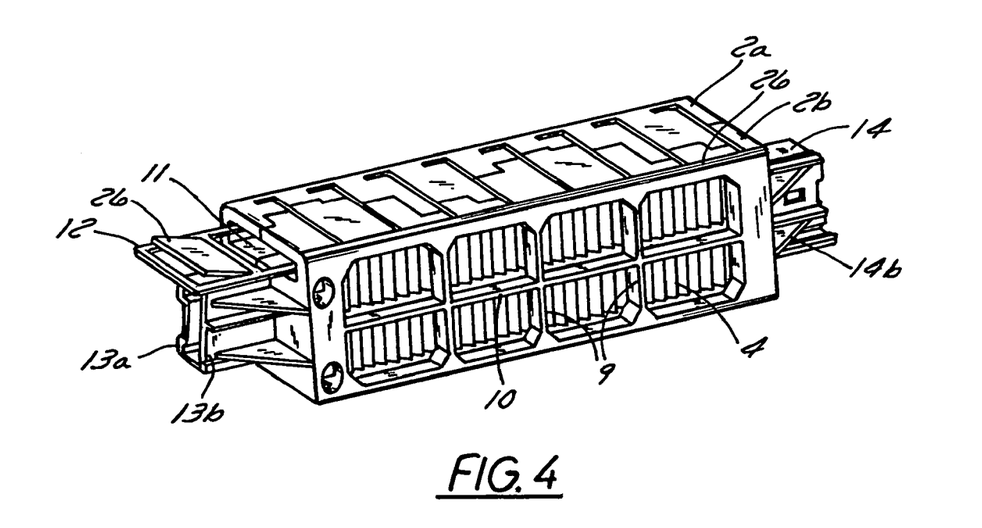
FIG. 4 a perspective view of the electric heater in which the resilient element is inserted.

As can be seen in FIG. 4, the resilient element 12 has a plurality of individual resilient segments for producing the clamping pressure. Preferred embodiments of the resilient element 12 will now be discussed in connection with FIGS. 10a, 10b, and 10c.

In the illustrated embodiments, the contact plates 6 and 7 are each arranged on the outside in the layered structure, so that the power supply takes place via the radiator elements 4 to the PTC heating elements 3. Said structure effects an excellent heat transition between the PTC heating elements 3 and the radiator elements 4 which output the heat to the air flowing therethrough, and heat conduction losses are therefore particularly small.

Thanks to the arrangement of the contact plates at the upper and lower ends of the layered structure of the elements of the heater, the air throughput is virtually not impeded. This makes it possible to keep the constructional height small without any reduction of the air passage volume.

Due to the design of the housing according to the invention with elongate housing faces that are made particularly stable from a mechanical point of view, the clamping forces are not received by the side bars of the holding frame in the conventional way. The narrow sides of the housing can thus be designed in any desired way. Preferably, the narrow sides of the housing are designed such that they allow for a mechanical fixation and electrical contacting of the heater. For electrical contacting at least one narrow side of the housing can be adapted in any desired way to the geometry of a connector for the supply of power.

The design of the narrow sides is shown by way of example in FIGS. 1 to 4. At the left housing side a connector shape is formed from the projections 13a, 13b respectively formed on both housing halves. Connector tongues 6a and 7a of the two contact plates 6, 7 project into said connector. At the opposite side, a connector 14 is formed from the projections 14a, 14b, the connector essentially serving the mechanical fastening of the electric heater. Since the narrow sides of the housing 2 cannot absorb great forces, they can be designed in any desired way for mechanical and/or electrical fastening.

Figure 5:
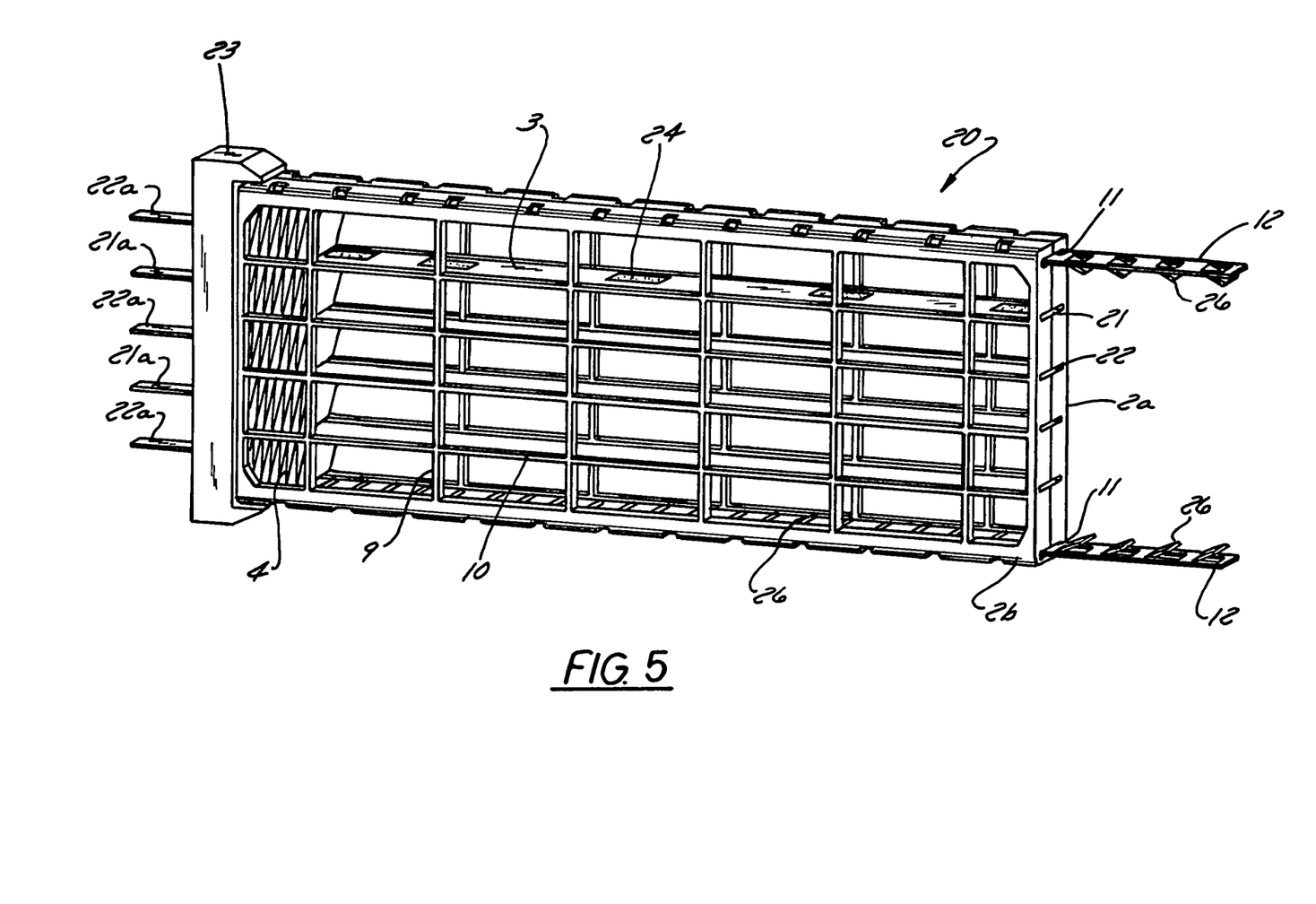
FIG. 5 a perspective view of another embodiment of the heater according to the invention.
Figures 6, 7:
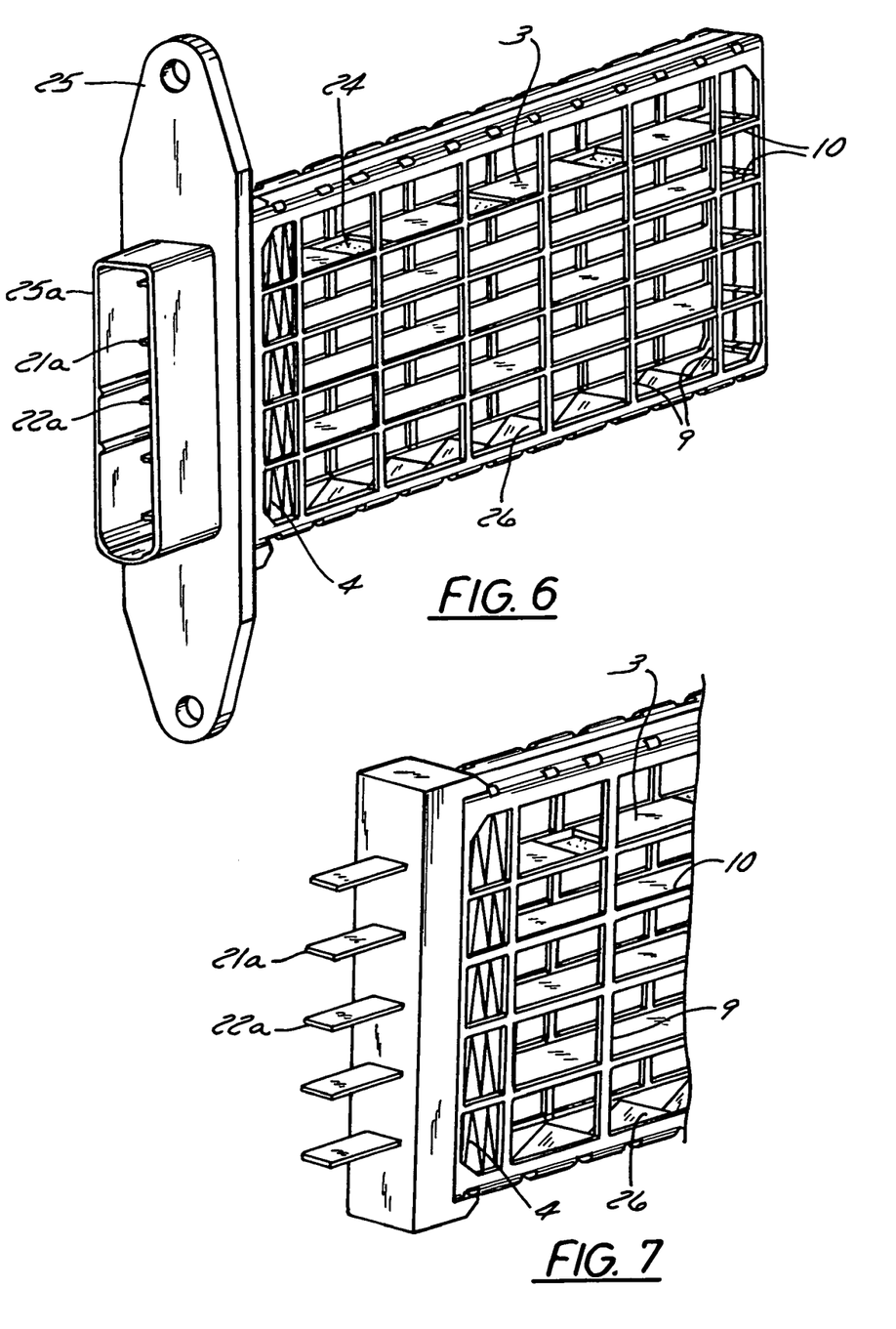
FIG. 6 a further perspective view of the embodiment shown in FIG. 5, in which the housing side is adapted by way of example to a special connector geometry.
FIG. 7 a further detail view of the embodiment shown in FIG. 5.

FIGS. 5 to 7 show a further embodiment of a housing and a corresponding electrical heater. FIG. 5 shows a perspective view of an embodiment of an electric heater 20 which is made smaller than the embodiment of FIGS. 1 to 4, but has a larger cross-sectional area for a higher air throughput. To this end the heater comprises PTC heating elements 3 in a plurality of planes in the layered structure. In contrast to FIG. 1, the PTC heating elements 3 having a rectangular shape are oriented with their longitudinal sides parallel to the elongate housing faces of the heater.

In accordance with each layer with PTC heating elements 3 in the layered structure consisting of radiator elements 4, PTC heating elements 3 and electrode sheets 21, 22, longitudinal struts 10 are respectively provided at the level of the layers with PTC heating elements 3. In the illustrated embodiment, a total of four layers with PTC heating elements 3 are present, and thus also four longitudinal struts.

Due to the larger longitudinal extension of the heater in comparison with the heater of FIGS. 1 to 4, said embodiment also comprises a greater number of transverse struts 9.

In contrast to the first embodiment, two resilient elements 12 are used in the illustrated heater, the two elements being inserted at the upper end and lower end, respectively, on the narrow side of the housing. The resilient means are each inserted in such a way that the resilient segments 26 projecting from the resilient element 12 protrude from the housing surface towards the layered structure. Although this is not shown, further resilient elements 12 can also be inserted between the illustrated positions into the layered structure.

On account of the plurality of the layers illustrated in this embodiment with PTC heating elements 3, a correspondingly higher number of contact sheets is needed. The uppermost and lowermost ones of the contact sheets 22 are arranged next to the upper housing inside and the lower housing inside, respectively. The three middle contact sheets are each arranged next to the three lower layers with PTC heating elements, i.e. matching the three lower ones of the longitudinal struts 10.

Each of the contact sheets 21, 22 has contact tongues 21a, 22a projecting out of the frame. The housing side 23 from which the contact tongues 21a, 22a are projecting may have any design. A particular embodiment is shown in FIG. 6. The housing 23 as shown in FIG. 5 has attached or adhered thereto an individually adapted connector shape 25. Said adhered connector shape can be adapted to the respective requirements, e.g. for installation of the heater in vehicles of different car manufacturers using different types of plug contacts. In the embodiment shown in FIG. 6, the attachable connector attachment 25 consists of a mechanical stop with fastening holes and a connector shoe 25a in which the contact tongues 21a, 22a are arranged.

According to a further special embodiment the housing is laterally sealed with the help of silicone seals. The silicone seals 24 are preferably arranged on the longitudinal struts as shown in FIGS. 5 to 7 and 11, 12. The silicone seals 24 are here arranged on the longitudinal struts, i.e. each exactly at the level of the PTC heating elements 3.

For an easier assembly during insertion of the seals, the silicone seals 24 have the shape of the grid structure of the struts. Manufacture is thereby simplified considerably because the seals for the longitudinal struts need not be inserted individually, but can be inserted as a whole in one step.

Figure 8:
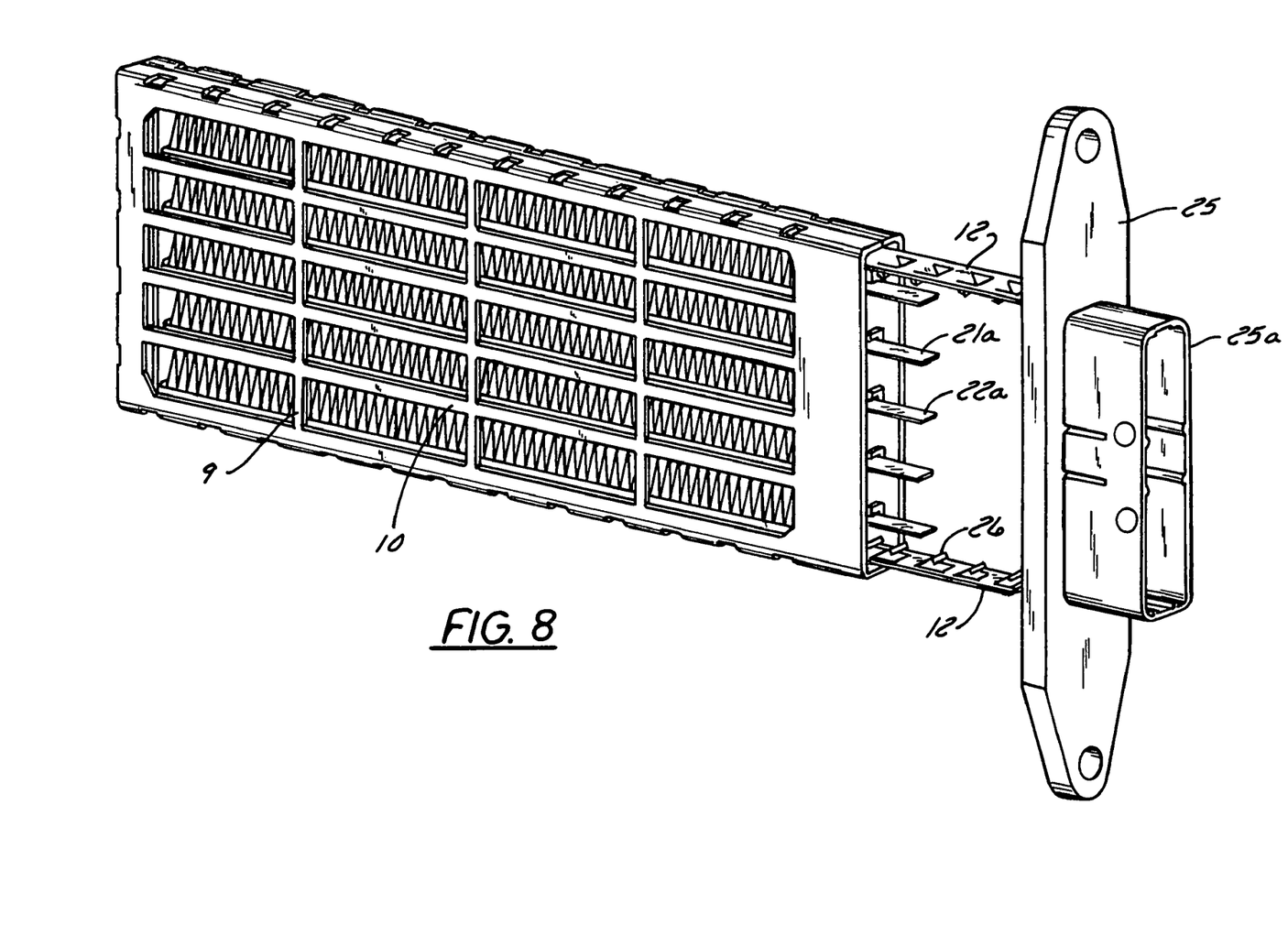
FIG. 8 a perspective view of a further embodiment of the heater according to the invention during assembly.
Figure 9:
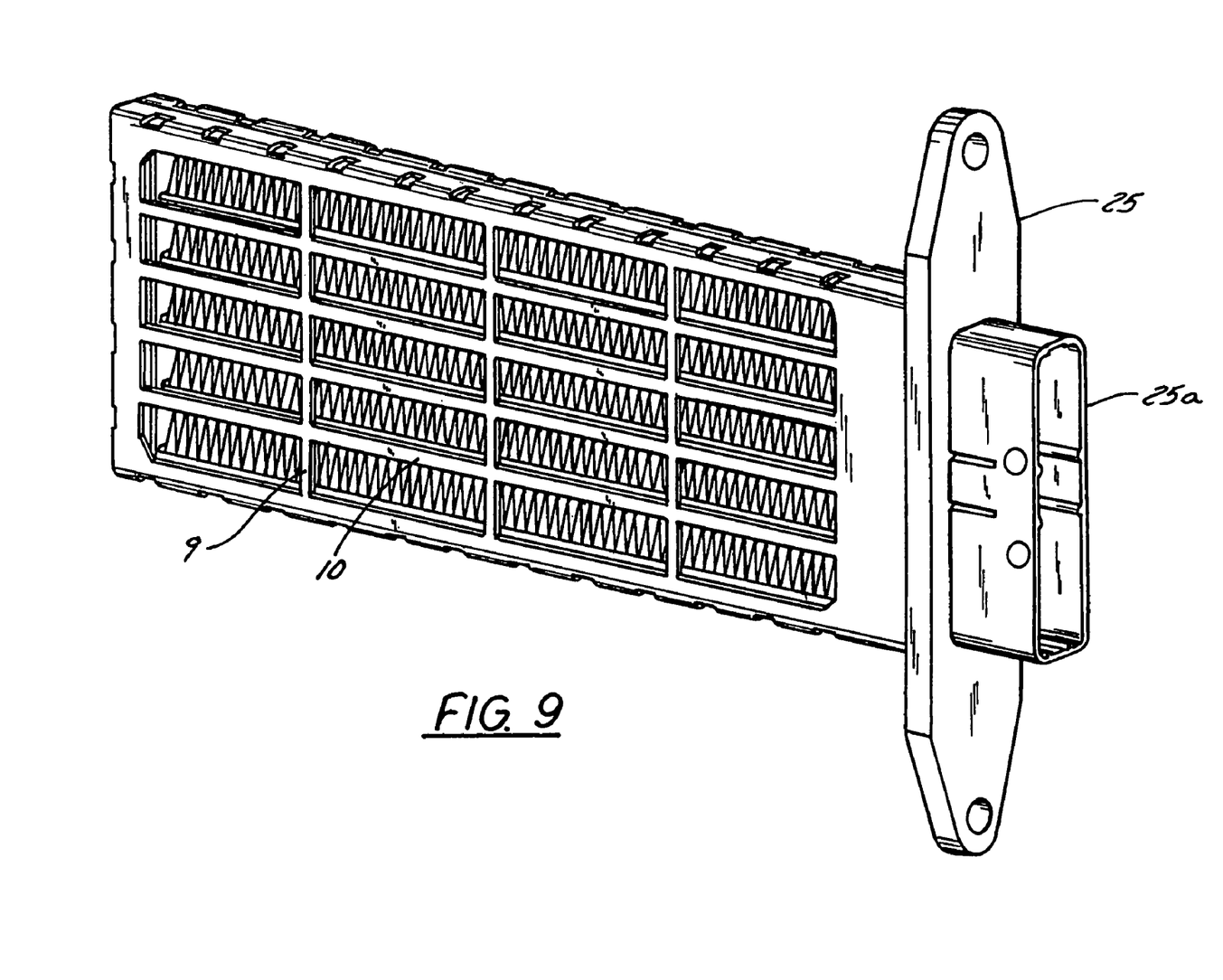
FIG. 9 a perspective view of the assembled embodiment according to FIG. 8.

FIGS. 8 and 9 are perspective views showing a further embodiment. Said embodiment differs from the embodiment shown in FIGS. 6 and 7, particularly by the number of the transverse struts. In this embodiment, use is made of fewer, but more stable transverse struts.

Preferably, transverse struts are arranged at a distance of 30 to 40 mm. At a distance of the transverse struts greater than 40 mm, particularly starting from about 60 mm, the clamping forces can no longer be received to an adequate extent by the transverse struts. By contrast, below a distance of the transverse struts of less than 30 mm, particularly less than 20 mm, the air throughput is considerably impeded by the elongate faces of the heater.

Figure 10:
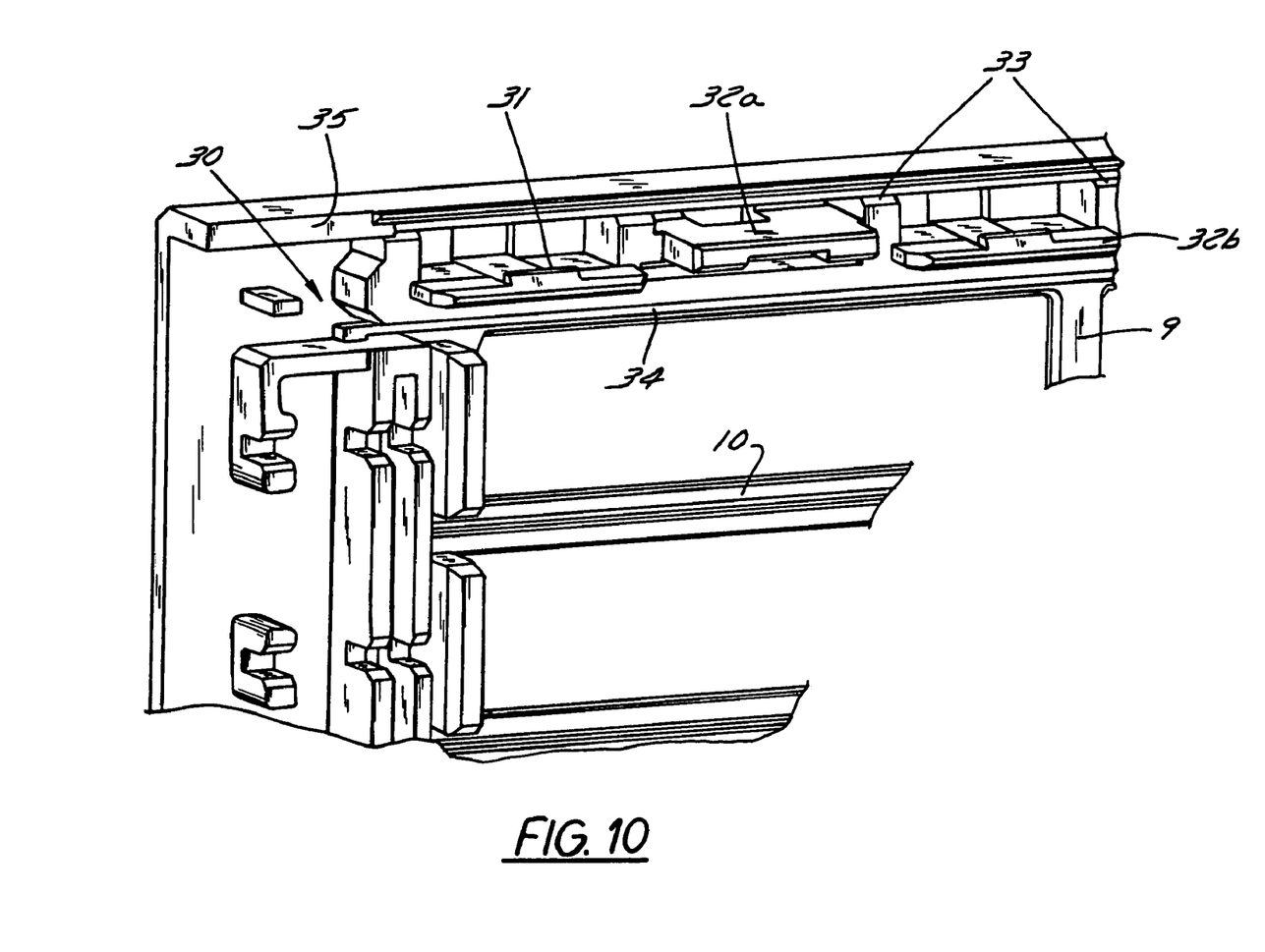
FIG. 10 a detail view of the inner side of a half-shell of the housing of a further embodiment of the invention.
Figure 11:
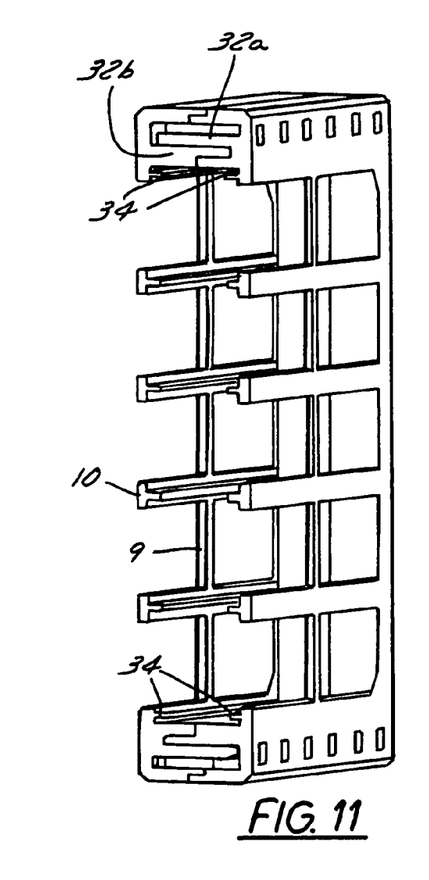
FIG. 11 a sectional view through the assembled housing according to the embodiment of FIG. 10.
Figure 12:
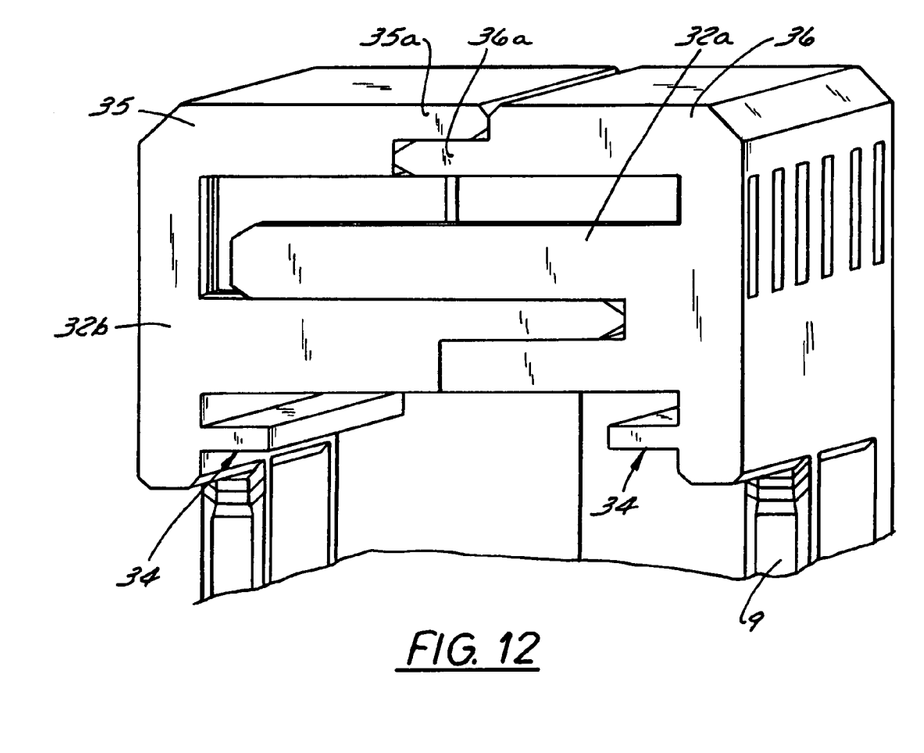
FIG. 12 an enlarged view of a detail of the illustration shown in FIG. 11.

FIGS. 10 to 12 show a particular embodiment for the design of the insides of the two half-shells of the housing. The inner structure of the half-shells comprises a resilient channel into which the resilient means 12 can be inserted after assembly of the two half-shells of the housing. The resilient channel effects a guiding of the resilient means during insertion, namely via laterally extending grooves.

The grooves are e.g. formed by projections 34 and either by the upper side of the housing or, like in the illustrated embodiment, via locking tabs 32a, 32b.

The projection 34 forms not only one side of the resilient channel for the insertion of the resilient means, but also serves as a positioning aid of the elements of the heater. These are (pre-)fixed by the projection 34 with a play in the housing around an insertion channel for the resilient means to be inserted after assembly.

Furthermore, the embodiment shown in FIGS. 10 to 12 has a higher stiffness. Such an additional stiffening may be required, for instance for the following reasons. To achieve a high efficiency also in the case of "large-area heaters", i.e. heaters that are small, but formed with a large area for a high air throughput, very high clamping forces are needed. However, at housing temperatures of about 170° C., the stiffness of the used plastic material is decreasing. Moreover, the resilient means can transmit the force not only to the edge of the housing because the resilient segments used have a minimum distance of about 2 mm to 2.5 mm from the edge of the resilient means. However, to prevent a deflection of the upper and lower housing sides, said sides are preferably stiffened in addition. To this end, oppositely arranged locking tabs 32a, 32b are respectively provided in both half-shells of the housing. Each of the locking tabs projects in the direction of the opposite housing halves, and they are interlocked via locking noses 31 during assembly. Thanks to this toothing on the upper and lower housing sides, the mechanical stiffness thereof is enhanced and deflection is avoided.

A further increase in stiffness can be achieved through an additional side wall 35, 36. Said side wall 35, 36 is respectively arranged above the former side walls and connected thereto via supporting elements 33. The mechanical stiffness of the upper and lower sides can thereby be increased such that the housing can receive particularly high clamping forces. This permits a "large-area construction", i.e. a heater having a large number of superimposed layers of PTC elements and interposed radiator elements.

Figure 13:
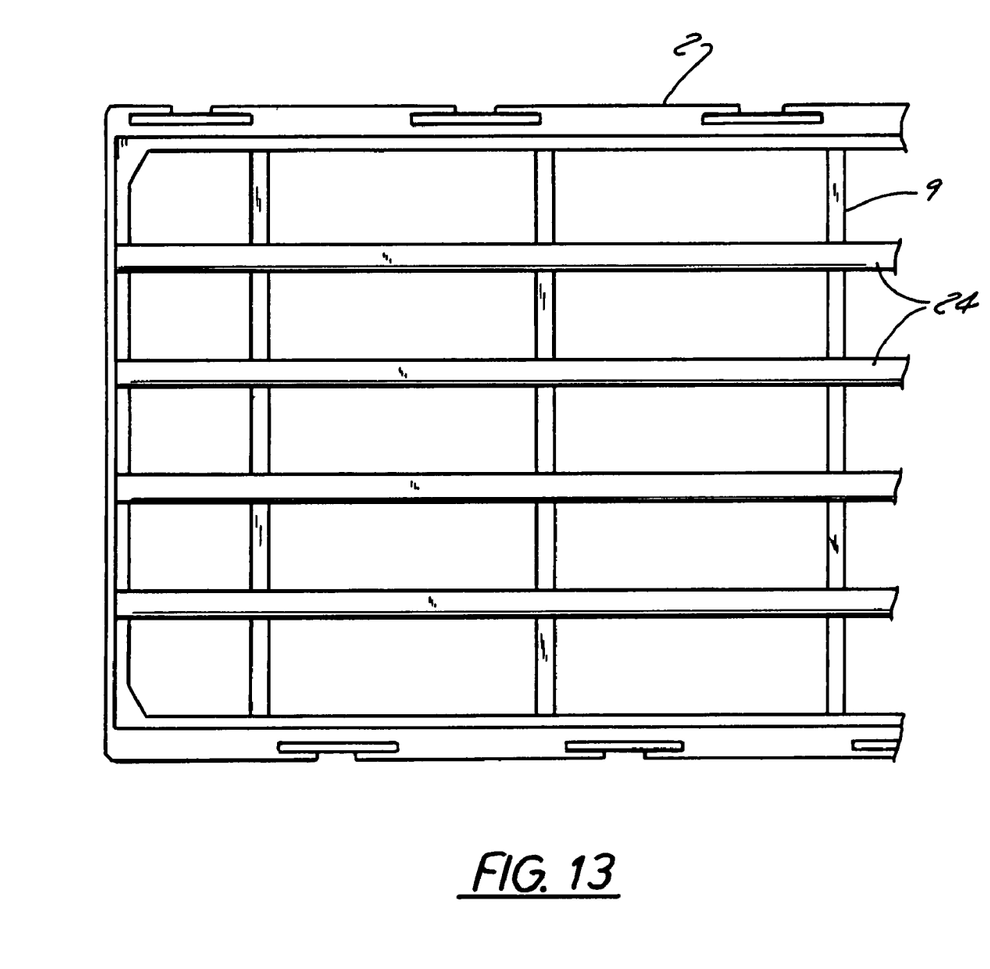
FIG. 13 an inner view of the grid structure of the elongate faces of the housing with silicone seals.
Figure 14:
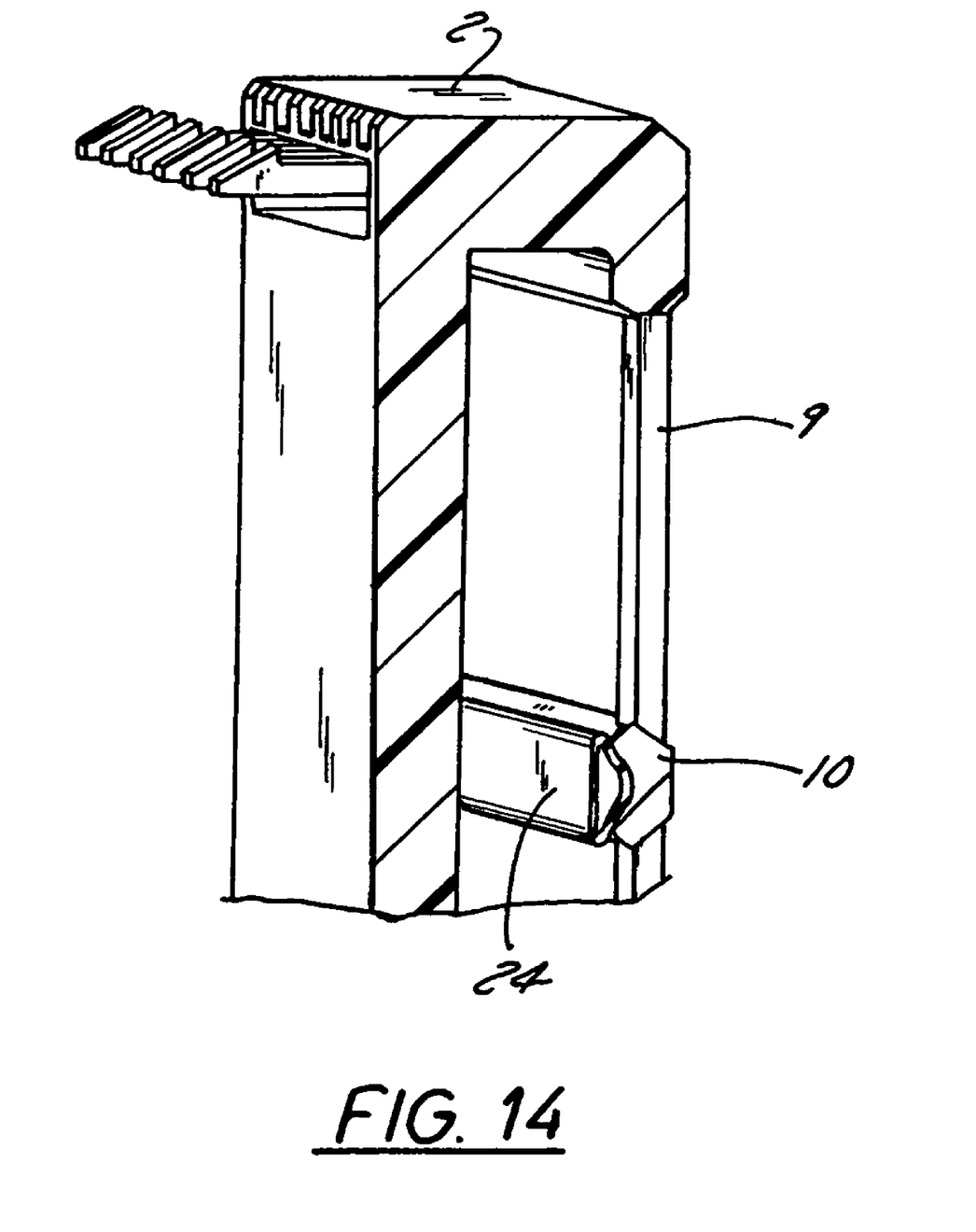
FIG. 14 a perspective, enlarged sectional view of a half-shell of the housing with seal.
Figure 15A:
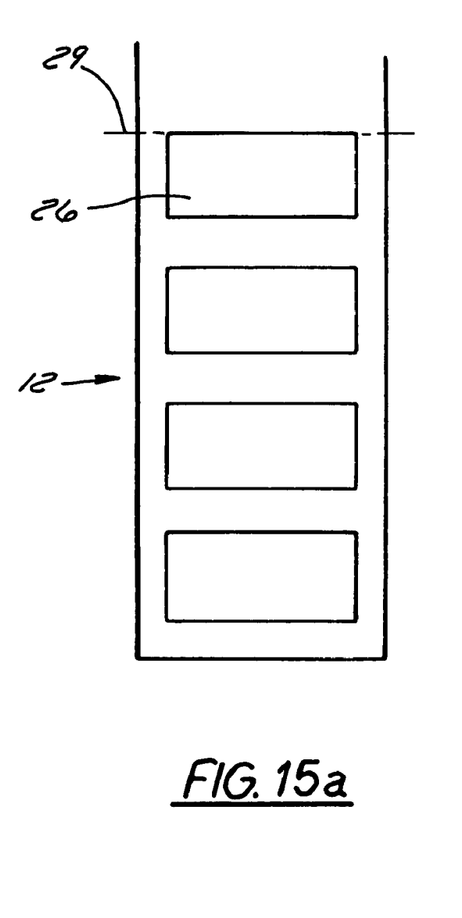
FIGS. 15a, 15b, and 15c various views of a resilient element according to the invention.
Figure 15B:
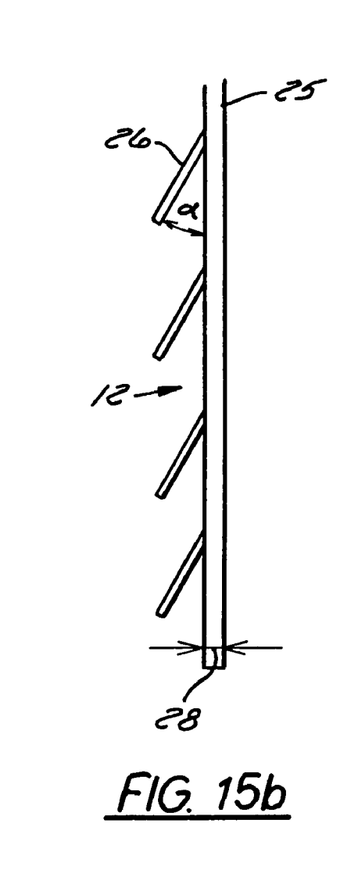
Figure 15C:
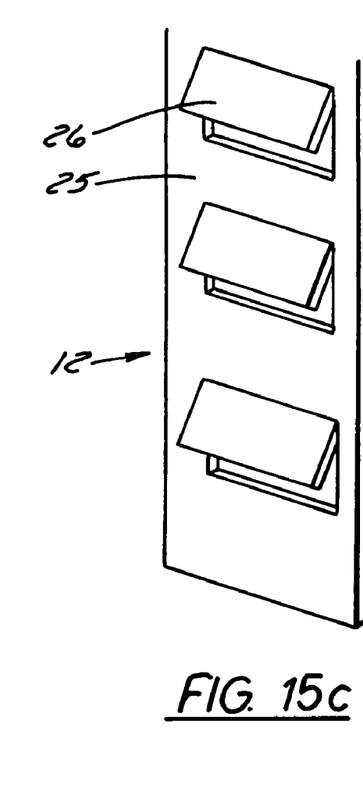

The construction of the resilient element 12 will be described in the following with reference to FIGS. 13a, 13b and 13c. FIG. 13a shows a top view on the resilient element 12, FIG. 13b a side view, and FIG. 13c a perspective view of the resilient element 12.

The resilient element 12 consists of a sheet member 26 and resilient segments 26 projecting therefrom. Preferably, the resilient element 12 is made integral, each of the resilient segments being punched on three sides out of the sheet member 25 and bent around an axis 29 in the transverse direction of the sheet member 25. The angle α around which the punched segments are bent out is approximately between 5° and 30°, preferably between 15° and 20°. This construction of the resilient element 12 prevents a deflection in transverse direction and only allows one in longitudinal direction. As a result, the resilient element only acts on the housing edge on which it is supported during generation of the clamping force. Thus the resilient means ideally cooperates with the housing, which on account of its construction can only receive large forces in the housing sides and is less capable of bearing loads in the middle in the area of the separation line. Preferably, the lateral ends of the resilient segments are arranged close to the edge of the resilient element for this purpose.

The illustration in FIGS. 13a, 13b and 13c is just a schematic one. The resilient segments 26 need not be rectangular, but may also have areas of different width and inclination. For instance, each resilient segment may have a broader end section which is slightly flattened to allow the resilient element to be pushed into the housing in an improved way.

Figure 16A:
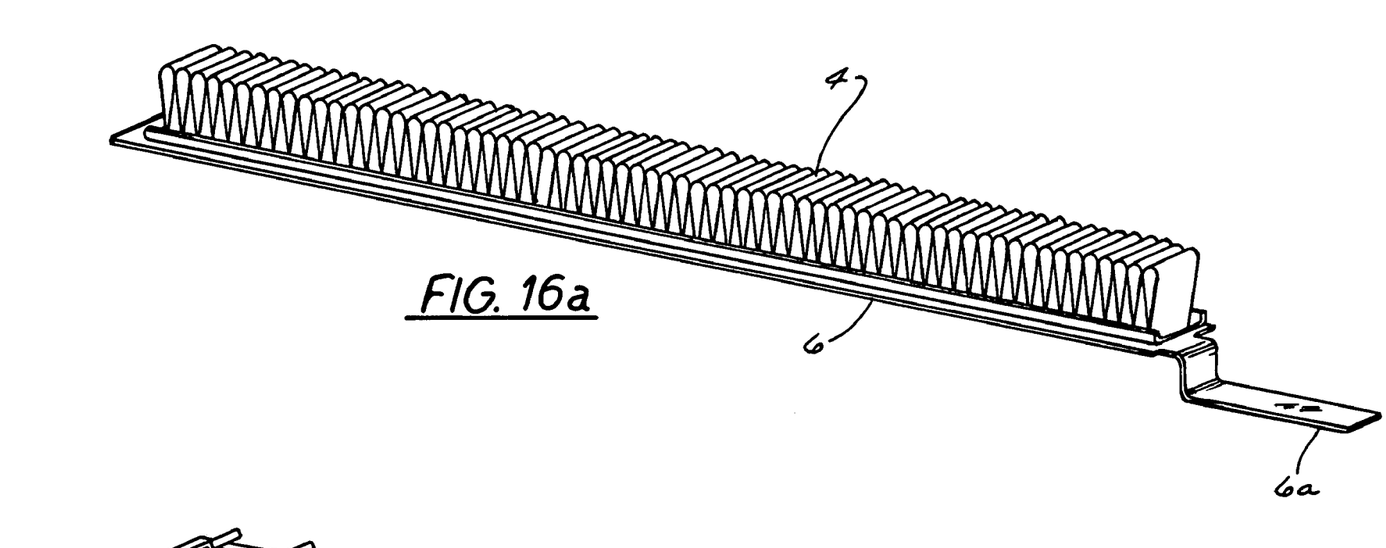
FIG. 16a a view of a corrugated rib element with a contact sheet attached to said element.
Figure 16B:
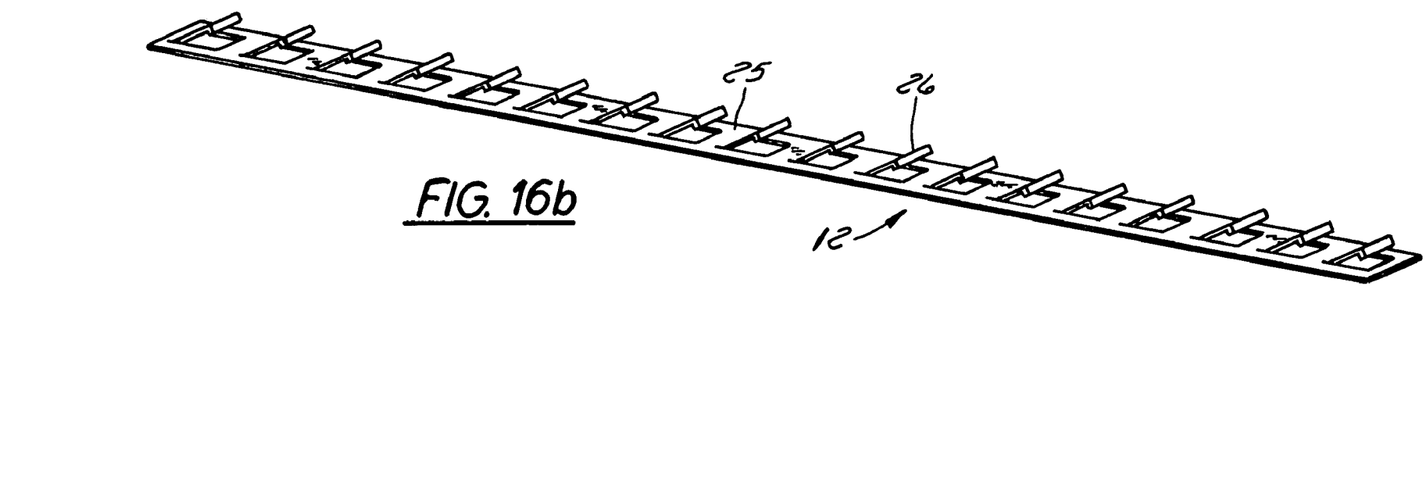
FIG. 16b a view of a further resilient element which can inter alia be inserted into the embodiment of the invention according to FIG. 8.

FIG. 16a shows a radiator element 4 and a contact sheet 6 connected thereto in an elongate embodiment for a "large-area heater" (e.g. according to FIG. 9). The corresponding resilient element is shown in FIG. 16b. The resilient element has a number of successively arranged resilient segments 26. Each of the resilient segments 26 is able to exert a contact pressure force of about 15 N. For enhancing the contact pressure force the resilient segments according to FIG. 16b are tightly positioned one after the other such that two or more resilient segments 26 are arranged across the surface of a PTC element. This doubles or even triples the clamping pressure. In contrast to conventional frame mountings, the clamping pressure is here evenly exerted over the whole length of the resilient means.

To allow the clamping forces to be absorbed by the resilient segments 26, the elongate faces of the housing can be equipped with transverse struts 9 such that two to not more than five resilient segments 26 are arranged between two successive transverse struts 9.

The embodiment according to FIG. 4 shows a resilient element 12 with two or more adjacently arranged resilient segments. This embodiment is advantageous in the case of shapes of housings that have a large depth.

While resilient means of a thickness of about 0.8 mm are used in the conventional way, resilient elements having a thickness of 0.2 to 0.5 mm, preferably about 0.3 mm, are employed in the new constructional principle. This effects a resilient action of the resilient segments 26 also at a small length of a resilient segment.

A special advantage of the heater of the invention is that the resilient element can be produced as an endless member for the first time and can thus be supplied from a roll during manufacture. Conventionally, each resilient segment is made separately and produced individually for all of the different heater lengths. Moreover, it suffices to provide only one resilient element per heater.

Apart from the small constructional height, a special advantage of the heater of the invention is that said heater can be produced in a particularly simple way. The heater is assembled as described in connection with FIGS. 1 to 4. According to the invention the individual elements are assembled—in contrast to conventional heaters—without the clamping forces acting on the layered structure. It is only after assembly of the housing that the resilient means is slid into the assembled housing (cf. FIG. 4).

To sum up, the invention refers to a new constructional principle for electric heaters in which the functions of frame and resilient means are separated from one another. A housing is used as a frame for an electric heater, the housing consisting of two half-shells. Positioning aids for the PTC heating elements are arranged in the housing. The longitudinal sides of the housing are made substantially open to allow air throughput through the heating register. In addition, a resilient means which compresses the layered structure of radiator elements, PTC heating elements and contact sheets is additionally inserted into the housing. The resilient means can be slid into the housing at a later time through an opening provided laterally in the housing. As a result, the housing will only be exposed to resilient forces after assembly when it can be loaded mechanically.

The new constructional principle has a number of advantages. On the one hand the weight can be reduced considerably at the same heating capacity with the construction according to the invention, as no metal frame is used, i.e. up to about 50 percent. Moreover, without additional measures and without additional weight, the heater has no exposed metal surfaces. A further advantage is the low constructional height that is up to about 30 percent below that of the conventional heaters. It is thus possible to realize also much smaller heating means than in the prior art, the heating means nevertheless achieving a high efficiency due to the clamping principle employed for increasing electrical and thermal contacting. Moreover, it is also possible to produce longer heating elements that with the conventional holding frame construction can only be realized under great efforts.

Moreover, a conventional positioning frame is not used for keeping the PTC heating elements spaced apart and for protecting the same, but the PTC heating elements are directly separated from one another via housing projections.

Moreover, the manufacturing efforts are considerably reduced in comparison with conventional heaters. The manufacture of the heater of the invention is much easier because no special device is needed for overcoming the resilient forces of the frame in the production process.

The constructional principle requires no special design of the side bars of a holding frame for absorbing the clamping force acting on the longitudinal bars. The narrow sides of the housing of the invention can thus be adapted in their design to any desired connector geometry surrounding the connector tongues of the contact sheets projecting from the housing.

In addition, the resilient means can thereby be produced at considerably lower costs. On the one hand, the thickness of the resilient means can be reduced and material can thus be saved. On the other hand, the resilient element can now be produced for the first time as a continuous member and supplied from a roll during manufacture. Moreover, a single resilient member is sufficient.

I claim:

1. An auxiliary electric heater for automotive vehicles, comprising
    a housing which is made open on longitudinal faces thereof, and
    a layered structure including
        at least one PTC heating element,
        a radiator element,
        contact sheets for power supply, and
        a resilient element, the layered structure being kept clamped in the housing by the resilient element,
        wherein an opening is provided in a lateral face of the housing for inserting the resilient element.

2. The electric heater according to claim 1, wherein a resilient channel is formed in the housing for receiving the resilient element.

3. The electric heater according to claim 1 further comprising positioning means for pre-fixing the elements of the heater in the housing.

4. The electric heater according to claim 3, wherein the positioning means simultaneously form a groove for guiding the resilient element during insertion.

5. The electric heater according to claim 1, wherein the longitudinal faces of the housing are mechanically reinforced by at least one transverse strut.

6. The electric heater according to claim 5, wherein the struts in the longitudinal faces of the housing have the shape of a grid structure.

7. The electric heater according to claim 5, wherein the grid structure has at least one longitudinal strut in the area of the PTC heating element.

8. The electric heater according to claim 1, wherein said housing is made from plastics.

9. The electric heater according to claim 1, wherein the layered structure includes multiple PTC heating elements, and wherein the housing further comprises positioning means for keeping the PTC heating elements mutually spaced apart.

10. The electric heater according to claim 1, wherein the housing comprises two half-shells.

11. The electric heater according to claim 10, wherein the half-shells of the housing can be put together.

12. The electric heater according to claim 11, further comprising locking pins or locking noses which, when the half-shells of the housing are put together, effect an interlocking of the two half-shells.

13. The electric heater according to claim 10, wherein the half-shells are configured such that they separate the housing approximately in the middle between the longitudinal faces of the housing.

14. The electric heater according to claim 13, further comprising respectively opposite projections provided on a separation line of the half-shells which will engage each other when the half-shells are assembled.

15. The electric heater according to claim 1, wherein the resilient element comprises a sheet member with resilient segments projecting therefrom.

16. The electric heater according to claim 1, wherein the resilient element is configured such that it transmits clamping forces essentially onto reinforced longitudinal sides of the housing.

17. The electric heater according to claim 15, wherein each of the resilient segments extends into edge portions of longitudinal sides of the sheet member.

18. The electric heater according to claim 17, wherein the sheet member is made integral with the resilient segments.

19. The electric heater according to claim 15, wherein the layered structure includes multiple PTC heating elements, and wherein at least one resilient segment is provided at each PTC heating element position for a frictional clamping action.

20. The electric heater according to claim 19, wherein at least two resilient segments are provided for each PTC heating element position.

21. The electric heater according to claim 1, further comprising at least one seal for sealing longitudinal struts relative to the PTC heating elements.

22. The electric heater according to claim 21, wherein the longitudinal faces of the housing are mechanically reinforced by transverse struts having the shape of a grid structure, and wherein the seal seals a whole grid structure.

23. The electric heater according to claim 22, wherein the seal for a housing side is respectively made integral.

24. A housing for an auxiliary heater for automotive vehicles, the housing comprising:
a housing structure for receiving a layered structure including at least one PTC heating element, a radiator element, contact sheets for power supply, and a resilient element, wherein the housing structure has a lateral opening for insertion of the resilient element.

25. The housing according to claim 24, wherein a resilient channel is formed in the housing structure for inserting the resilient element.

26. The housing according to claim 24, further comprising positioning means in the housing structure for pre-fixing the elements of the heater.

27. The housing according to claim 26, wherein the positioning means in the housing structure form a groove for guiding the resilient element at the same time.

28. The housing according to claim 24, wherein the housing structure has longitudinal faces that are mechanically reinforced by at least one transverse strut.

29. The housing according to claim 28, wherein the struts in the longitudinal faces of the housing structure have an open configuration and are in the form of a grid structure.

30. The housing according to claim 24, wherein the housing is made from plastics.

31. An auxiliary electric heater for an automotive vehicle, the electric heater comprising:
a housing having open longitudinal faces; and
a layered structure including of at least one PTC heating element, a radiator element, contact sheets for power supply, and a resilient element, the layered structure being clamped in the housing by the resilient element, wherein an opening is provided in a lateral face of the housing for inserting the resilient element.

32. The electric heater according to claim 31, wherein a resilient channel is formed in the housing for receiving the resilient element.

33. The electric heater according to claim 31, further comprising positioning means for pre-fixing the elements of the heater in the housing.

34. The electric heater according to claim 31, wherein the longitudinal faces of the housing are mechanically reinforced by at least one transverse strut.

35. The electric heater according to claim 31, wherein the housing comprises positioning means for keeping the PTC heating elements mutually spaced apart.

36. The electric heater according to claim 31, wherein the housing comprises two half-shells.

37. The electric heater according to claim 31, wherein the resilient element comprises a sheet member with resilient segments projecting therefrom.

38. The electric heater according to claim 31, wherein the resilient element is configured such that it transmits the clamping forces essentially onto reinforced longitudinal sides of the housing.

39. An auxiliary electric heater for an automotive vehicle, the electric heater comprising:
a housing having open longitudinal faces; and
a layered structure including of at least one PTC heating element, a radiator element, contact sheets for power supply, and a resilient element, the layered structure being clamped in the housing by the resilient element, wherein an opening is provided in a lateral face of the housing for inserting the resilient element, wherein the resilient element is configured such that it transmits the clamping forces essentially onto reinforced longitudinal sides of the housing, and wherein the sides of the housing are reinforced by longitudinal struts, and further comprising at least one seal for sealing the longitudinal struts relative to the PTC heating elements.

40. The electric heater according to claim 1, wherein the opening is fully enclosed about an entire perimeter thereof.

41. The housing according to claim 24, wherein the opening is fully enclosed about an entire perimeter thereof.

42. The electric heater according to claim 31, wherein the opening is fully enclosed about an entire perimeter thereof.

* * * * *